United States Patent Office 3,268,576
Patented August 23, 1966

3,268,576
DI-ALKANOIC ACID ESTERS OF 2,2'-(ETHYLENE-DIIMINO)-DI-1-BUTANOLS
Raymond George Wilkinson, Montvale, and Robert Gordon Shepherd, Ridgewood, N.J., assignors to American Cyanamid Company, New York, N.Y., a corporation of Maine
No Drawing. Original application Jan. 23, 1962, Ser. No. 168,241, now Patent No. 3,176,040, dated Mar. 30, 1965. Divided and this application Feb. 12, 1965, Ser. No. 432,401
Claims priority, application Great Britain, Feb. 7, 1961, 4,517/61, Patent 961,317
7 Claims. (Cl. 260—490)

This application is a division of our copending application Serial No. 168,241, filed January 23, 1962, now Patent No. 3,176,040, which is a continuation-in-part of our application Serial No. 77,034, filed December 20, 1960, now abandoned, which is a continuation-in-part of our application Serial No. 33,399, filed June 2, 1960, now abandoned. Applicants claim priority under their British application Serial No. 4,517, filed February 7, 1961 (License No. 261,516, dated January 27, 1961), now British Patent No. 961,317, for all that is disclosed therein which is not disclosed in their applications Serial No. 33,399 and Serial No. 77,034.

This invention relates to novel symmetrical ethylenediamines and, more particularly, is concerned with derivatives of N-[N'-(α-ethyl-β-hydroxyethyl)-β-aminoethyl]-β-ethyl-β-aminoethanol which may be represented by the following general formula:

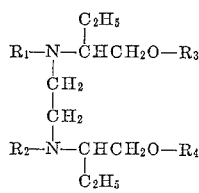

wherein $R_1$ and $R_2$ are the same and are methyl or ethyl; and $R_3$ and $R_4$ are the same and are lower alkanoyl. Suitable lower alkanoyl groups contemplated by the present invention are those having up to about six carbon atoms.

The novel compounds of the present invention, in general, white crystalline solids or colorless oils, soluble in lower alkanols and variably soluble in water, acetone, chloroform, ether, benzene, petroleum ether and the like. The acid-addition salts of the novel compounds of the present invention are, in general, soluble in water and hot alkanols, but relatively insoluble in non-polar organic solvents such as benzene, ether and the like. The non-toxic acid-addition salts of the novel symmetrical ethylenediamines of the present invention with a variety of organic and inorganic acids are also included within the scope of the invention. Thus, acid-addition salts formed by admixture of the organic free base with an acid, suitably in a neutral solvent, are formed with such acids as sulfuric, phosphoric, hydrochloric, hydrobromic, citric, lactic, tartaric, acetic, benzoic, ascorbic and the like. For purposes of this invention, the organic free bases are equivalent to their non-toxic acid-addition salts.

It is known that tuberculosis is a contagious disease which usually runs a protracted course, often lasting for years before death or recovery. Relapses are common. It is one of the most important causes of prolonged disability and chronic ill health. It is caused by the tubercle bacillus *Mycobacterium tuberculosis*. Human tuberculosis is usually caused either by the human strain or the bovine (cattle) strain of the bacillus. The bacillus is comparatively resistant. Tuberculosis is commonly acquired either by the inhalation of droplets of infected sputum, either fresh or dried, or by the consumption of milk from tuberculous cows.

Until the discovery of streptomycin, it was impossible to attack the tubercle bacillus directly. Treatment was based on rest, nutrition, fresh air, good meals and collapse therapy; in other words on the recuperative powers of the body. The discovery of streptomycin ushered in a new era in the treatment of tuberculosis. Streptomycin, however, has a number of significant shortcomings, such as the fact that it is not always well tolerated and must be given by injection. Furthermore, the bacillus may become resistant to streptomycin so that it loses its therapeutic value. Para-aminosalicylic acid has also been found to be a weak antituberculous agent. However, when used with streptomycin, it reinforces the action of streptomycin and delays the appearance of resistant strains of the bacillus. Nicotinamide and pyrazinamide have also been tried but both of these compounds also have significant shortcomings.

The novel compounds of the present invention are active against experimental human strain tuberculosis in mice. Furthermore, the chemical structures of these compounds are distinct from the drugs heretofore found effective against tuberculosis and should be particularly useful in treating resistant tuberculosis and also in combination therapy which is widely used in this field.

In testing the compounds of the present invention for anti-tuberculous activity the organism used in the test is *Mycobacterium tuberculosis* (H37Rv). The test animals are white female mice. The test animals are infected with the organisms by administration intravenously of 0.2 ml. of a buffered saline suspension containing approximately 1.5 mg./ml., wet weight, of a 12 or 13 day culture of the test organism grown on solid Sauton's medium composed of: 0.05 gm. iron ammonium citrate; 0.5 gm. dipotassium phosphate; 0.5 gm. magnesium sulfate; 2.0 gm. citric acid; 4.0 gm. asparagine; 35.0 ml. glycerine; dist. water q.s. 1000 ml.

During a one year experience with this test, the standard infection defined above caused a 99.5% mortality, in that 756 of the 760 infected untreated control mice died within 30 days, the normal period of the test. Routinely, each week 200–300 mice are given the standard infection and then segregated in a random manner into cages each of which holds five or ten mice. Four groups of five mice each are retained as untreated controls, and the remaining mice are used to ascertain drug activity.

Drug treatment is administered orally as follows: A measured amount of the compound to be tested is mixed with a weighed amount of feed, and the test animals are allowed to feed at will for 14 days from the time of infection—the controls, of course, on untreated feed. All surviving animals are then allowed to feed at will on untreated feed for the remainder of the 30 day test period. A compound is judged active if it either saves 2 or more of the 5 mice in the test group, or prolongs average survival time by 4 or more days, compared to untreated controls.

The following table summarizes the relative activity of typical compounds compared to p-aminosalicylic acid (as 100%) based on the minimum quantities of compounds needed to give the same response shown by p-aminosalicylic acid.

TABLE I

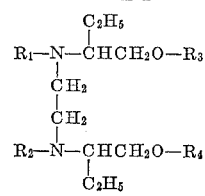

| Compound (Example No.) | R₁ | R₂ | R₃ | R₄ | Relative Activity, percent |
|---|---|---|---|---|---|
| 6 | CH₃ | CH₃ | $\overset{O}{\underset{\|}{C}}$—CH₃ | $\overset{O}{\underset{\|}{C}}$—CH₃ | 3,200 |
| 7 | CH₃ | CH₃ | $\overset{O}{\underset{\|}{C}}$—C₄H₉ | $\overset{O}{\underset{\|}{C}}$—C₄H₉ | 1,600 |
| 8 | CH₃ | CH₃ | $\overset{O}{\underset{\|}{C}}$—H | $\overset{O}{\underset{\|}{C}}$—H | 3,200 |

The intermediate N-[N'-(α-ethyl-β-hydroxyethyl)-β-aminoethyl]-β-ethyl-β-aminoethanol may be readily prepared by the interaction of an ethylene dihalide with two equivalents of 2-amino-1-butanol. In like manner, the intermediate N,N'-dimethyl and N,N'-diethyl derivatives of N - [N' - (α - ethyl - β-hydroxyethyl)-β-aminoethyl]-β-ethyl-β-aminoethanol may also be readily prepared by the interaction of an ethylene dihalide with two equivalents of 2-methylamino-1-butanol or 2-ethyl-amino-1-butanol, respectively. This preparative method is illustrated by Examples 1 and 3 hereinafter. The N-[N'-(α-ethyl-β-hydroxyethyl)-β-aminoethyl]-β-ethyl-β-aminoethanol and its N,N'-dimethyl and N,N'-diethyl derivatives may also be conveniently prepared by the interaction of glyoxal with 2-amino-1-butanol, 2-methylamino-1-butanol or 2-ethylamino-1-butanol, respectively, followed by reduction of the Schiff base intermediates with lithium aluminum hydride. This method is illustrated by Example 5 hereinafter. The N,N' - dimethyl derivative of N-['-(α-ethyl - β - hydroxyethyl) - β - aminoethyl] - β - ethyl-β-aminoethanol may also be readily prepared by treatment of N-[N'-(α - ethyl - β - hydroxyethyl) - β - aminoethyl] - β - ethyl-β-aminoethanol with formaldehyde in concentrated formic acid. This method is illustrated by Example 2 hereinafter. The N,N'-diethyl derivative of N - [N' - (α - ethyl - β - hydroxyethyl) - β - aminoethyl]-β-ethyl-β-aminoethanol may also be readily prepared by treating the N - [N' - (α - ethyl - β - hydroxyethyl) - β-aminoethyl] - β - ethyl - β - aminoethanol with excess acetic anhydride and reducing the intermediate N,N'-O,O'-tetra-acetyl derivative with lithium aluminum hydride, the O-acetyl functions being removed during the reduction. This method is illustrated by Example 4 hereinafter.

The O,O'-di(lower alkanoyl) derivatives of N-methyl-N - [N' - methyl - N' - (α - ethyl - β - hydroxyethyl) - β-aminoethyl]-β-ethyl - β - aminoethanol and N-ethyl-N-[N' - ethyl - N' - (α - ethyl - β - hydroxyethyl) - β-aminoethyl]-β-ethyl-β-aminoethanol may be readily prepared by treating the appropriate ethylenediamine base with a lower alkanoic anhydride wherein the lower alkanoyl group has from 1 to 6 carbon atoms. This method is illustrated by Examples 6, 7 and 8 hereinafter.

A dosage unit of a symmetrical ethylenediamine of the present invention for an adult patient comprises from about 5 mg. to about 200 mg. per kg. of body weight per day of active ingredient. A dosage unit for optimum results would be from about 5 mg. to about 50 mg. per kg. of body weight per day of symmetrical ethylenediamine in the treatment of tubercle bacilli infections. Such dosage units are employed in such a manner that a total of from about 0.5 to 10 grams of active ingredient for an adult based on about 150 lbs. are administered orally in a 24 hour period. In children, the daily intake of symmetrical ethylenediamine may be reduced in proportion to their weight.

A preferred dosage unit form is a table which for an adult would preferably contain from about ¼ to about 4 grams of drug and for children, from about 100 to about 800 mg. of drug. Larger tablets can, of course, be used and, if desired, scored to be broken into dosage units or a number of smaller tablets adapted to be taken at one time will constitute a satisfactory dosage unit. A further preferred dosage unit form is a capsule which may contain a similar amount of active ingredient along with the necessary fillers or diluents. Other dosage forms well known to the pharmeceutical industry can be used in like manner.

The dosage units of drug may contain other inert or medically active materials, for instance, when the dosage unit form is a table, pill or granules, there may also be present various binders, fillers or solid diluents. Suitable materials for this purpose may be, for example, starch such as corn starch or sugar such as lactose or sucrose. There may also be present various medically active materials such as, for example, p-amino salicyclic acid. When the dosage unit form is a capsule, it may contain in addition to materials of the above type a liquid carrier such as a fatty oil. The dosage unit form may also have present various flavors, oil of wintergreen, and excipients such as dicalcium phosphate. Various other materials may be present as coatings or to otherwise modify the physical form of the dosage unit, for instance, pills or capsules may be coated with shellac, sugar or both. Of course, any material used in preparing the dosage unit form must be pharmaceutically pure and substantially non-toxic in the amounts employed.

The following examples illustrate the preparation of typical symmerical ethylenediamines of the present invention.

*Example 1.—N-[N'-(α-ethyl-β-hydroxyethyl)-β-aminoethyl]-β-ethyl-β-aminoethanol*

To 227 g. (2.55 moles) of 2-amino-1-butanol was added 100 g. (1.0 mole) of ethylene dichloride. The mixture was heated at reflux and in a few minutes the exothermic reaction required the removal of exterior heating. After 10 minutes, exterior heating was recommenced for an additional 20 minutes. The hot mixture was then treated with 300 ml. of methanol and then cautiously with 84 g. (2.1 moles) of sodium hydroxide in 80 ml. of water. The precipitated sodium chloride was removed by filtration. The excess 2-amino-1-butanol distilled as a light yellow oil at 83–87° C./13 mm. The viscous residue distilled at 165–170° C./0.6 mm. as a light yellow oil which tended to solidify in the air condenser; yield, 180 g. Recrystallization by dissolving in 80 ml. of hot ethanol, adding about 150 ml. of petroleum ether (B.P. 90–100° C.), and cooling at 5° C. overnight, gave 64 g. of white crystals melting at 128–132.5° C. This, on recrystallization from 100 ml. of 95% ethanol, gave 35 g. of white crystals melting at 134.5–136° C. and a second crop of 10 g. melting at 132.5–134° C. which is the meso base. Its dihydrochloride melts at 202–203° C.

From the ethanolic filtrates upon addition of 130 ml. of about 4 N ethanolic hydrochloric acid and cooling, there was obtained 55 g. of white crystals melting at 176.5–178° C. and a second crop of 10 g. melting at 171.5–174.5° C. This is the *dl* racemate dihydrochloride.

*Example 2.—N-methyl-N-[N'-methyl-N'-(α-ethyl-β-hydroxyethyl)-β-aminoethyl]-β-ethyl-β-aminoethanol*

To 16.5 g. (0.36 mole) of 98% formic acid was added 10.0 g. (0.048 mole) of N-[N'-(α-ethyl-β-hydroxyethyl)-β-aminoethyl]-β-ethyl-β-aminoethanol in portions, with cooling. Then, 9.0 g. (0.105 mole) of 37% formaldehyde was added and the mixture was heated on the steam bath. After evolution of carbon dioxide ceased, refluxing was continued for an additional six hours. The solution was cooled, treated with 15 ml. of conc. HCl and filtered prior to refluxing for 1.5 hours. After vacuum evaporation, the resulting yellow viscous liquid was treated with 25% NaOH and the organic layer extracted into benzene. The combined extracts were dried over anhydrous Na₂CO₃ and concentrated leaving an oily residue which on distillation under high vacuum yielded the product as a colorless oil, 7.4 g., B.P. 132–134° C./0.01 mm.

*Example 3.—N-ethyl-N-[N'-ethyl-N'-(α-ethyl-β-hydroxyethyl)-β-aminoethyl]-β-ethyl-β-aminoethanol*

A mixture of 33 g. (0.28 mole) of 2-ethylamino-1-butanol and 13.2 g. (0.07 mole) of ethylene dibromide was heated to reflux for 2 hours with a vigorous initial reaction. To the cooled mixture 30 ml. of 10 N NaOH was added and the resulting oil layer was extracted with benzene. After drying over anhydrous $Na_2CO_3$ the benzene and excess 2-ethylamino-1-butanol were distilled and the residue, 12 g., distilled at 90–130° C./0.02 mm. On redistillation, the product boiled at 135–138° C./0.07 mm.

*Example 4.—N-ethyl-N-[N'-ethyl-N'-(α-ethyl-β-hydroxyethyl)-β-aminoethyl]-β-ethyl-β-aminoethanol*

An alternate method of preparing the product of Example 3 is to treat N-[N'-(α-ethyl-β-hydroxyethyl)-β-aminoethyl]-β-ethyl-β-aminoethanol with excess acetic anhydride to obtain the N,N',O,O'-tetra-acetyl derivative. By reduction of this intermediate with lithium aluminum hydride in diethyl ether at the reflux temperature for a period of several hours, the desired N,N'-diethyl derivative is obtained, the O-acetyl functions being removed during the reaction.

*Example 5.—N-[N'-(α-ethyl-β-hydroxyethyl)-β-aminoethyl]-β-ethyl-β-aminoethanol*

To 6.0 g. (0.03 mole) of 30% aqueous glyoxal was added 9.2 g. of 2-aminobutanol (with moderate heat evolution) and 30 ml. of absolute ethanol. A total of 3.7 g. (0.1 mole) of sodium borohydride was added in portions over 10 minutes. The reaction mixture, after the vigorous reaction had subsided, was heated for 30 minutes. On adding water and extracting with chloroform, the meso isomer, M.P. 131–134° C., was isolated on cooling. The dl isomer was isolated as the dihydrochloride salt, M.P. 172–175° C. on acidifying the filtrate with ethanolic HCl.

*Example 6.—N-methyl-N-[N'-methyl-N'-(α-ethyl-β-hydroxyethyl)-β-aminoethyl]-β-ethyl-β-aminoethanol diacetyl ester*

To a solution of 4.63 g. of dextro N-methyl-N-[N'-methyl-N'-(α-ethyl-β-hydroxyethyl)-β-aminoethyl]-β-ethyl-β-aminoethanol in 25 ml. of benzene was added a solution of 16.3 g. of acetic anhydride in 25 ml. of benzene. After the exothermic reaction had subsided, the reaction mixture was concentrated under reduced pressure. The black residue was dissolved in ether and added to a solution of 11.08 g. of oxalic acid dihydrate in 12 ml. of ether. The solid which had precipitated was dissolved in a boiling mixture of 8 ml. of water and 250 ml. of methanol, decolorized with charcoal, diluted with 100 ml. of ether and cooled. The dextro N-methyl-N-[N'-methyl-N' - (α - ethyl - β-hydroxyethyl)-β-aminoethyl]-β-ethyl-β-aminoethanol diacetyl ester oxalate was obtained as white crystals, M.P. 164–165° C.

*Example 7.—N-methyl-N-[N'-methyl-N'-(α-ethyl-β-hydroxyethyl)-β-aminoethyl]-β-ethyl-β-aminoethanol di-n-valeryl ester*

The procedure of Example 6 was repeated substituting an equimolar amount of n-valeric anhydride for the acetic anhydride employed in that example. There was thus obtained the white crystalline dextro N-methyl-N-[N'-methyl - N' - (α - ethyl-β-hydroxyethyl)-β-aminoethyl]-β-ethyl-β-aminoethanol di-n-valeryl ester di-d-tartrate.

*Example 8.—N - methyl-N-[N'-methyl-N'-(α-ethyl-β-hydroxyethyl)-β-aminoethyl]-β-ethyl-β - aminoethanol diformyl ester*

When, in the procedure of Example 2, the 1.5 hour period of refluxing subsequent to acidification with HCl is omitted, the diformyl ester is obtained instead of the hydroxy compound of Example 2. The diformyl ester possesses the characteristic absorption in the infrared at 1730 cm.$^{-1}$ (ester carbonyl stretching frequency).

What is claimed is:

1. A member of the class consisting of symmetrical ethylenediamines of the formula:

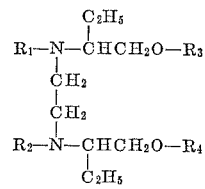

wherein $R_1$ and $R_2$ are the same and are selected from the group consisting of methyl and ethyl, and $R_3$ and $R_4$ are the same and are lower alkanoyl, and the non-toxic acid-addition salts thereof.

2. The compound N-methyl-N-[N'-methyl-N'-(α-ethyl-β - hydroxyethyl) - β - aminoethyl] - β - ethyl - β - aminoethanol diformyl ester.

3. The compound N-methyl-N-[N'-methyl-N'-(α-ethyl-β - hydroxyethyl) - β - aminoethyl] - β - ethyl - β - aminoethanol diacetyl ester.

4. The compound N-methyl-N-[N'-methyl-N'-(α-ethyl-β - hydroxyethyl) - β - aminoethyl] - β - ethyl - β - aminoethanol di-n-valeryl ester.

5. The compound N-ethyl-N-[N'-ethyl-N'-(α-ethyl-β-hydroxyethyl)-β-aminoethyl] - β-ethyl-β-aminoethanol diacetyl ester.

6. The compound N-ethyl-N-[N'-ethyl-N'-(α-ethyl-β-hydroxyethyl)-β-aminoethyl] - β-ethyl-β-aminoethanol dipropionyl ester.

7. The compound N-ethyl-N-[N'-ethyl-N'-(α-ethyl-β-hydroxyethyl)-β-aminoethyl] - β-ethyl-β-aminoethanol di-n-butyryl ester.

References Cited by the Examiner

UNITED STATES PATENTS 2,344,539   3/1944   De Groote _____ 260—490

LORRAINE A. WEINBERGER, *Primary Examiner.*

V. GARNER, *Assistant Examiner.*